United States Patent
Puthalath et al.

(10) Patent No.: US 9,462,051 B2
(45) Date of Patent: *Oct. 4, 2016

(54) DYNAMIC CACHE SELECTION METHOD AND SYSTEM

(71) Applicant: Telefonaktiebolaget L M Ericsson (publ), Stockholm (SE)

(72) Inventors: Hareesh Puthalath, Stockholm (SE); Andreas Johnsson, Uppsala (SE); Ayodele Damola, Solna (SE); Stefan Hellkvist, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/681,224

(22) Filed: Apr. 8, 2015

(65) Prior Publication Data

US 2015/0215396 A1 Jul. 30, 2015

Related U.S. Application Data

(63) Continuation of application No. 13/515,234, filed on Jun. 11, 2012, now Pat. No. 9,049,199, which is a continuation of application No. PCT/IB2009/007753, filed on Dec. 14, 2009.

(51) Int. Cl.
*G06F 15/173* (2006.01)
*H04L 29/08* (2006.01)
(Continued)

(52) U.S. Cl.
CPC ........... *H04L 67/1025* (2013.01); *H04L 45/00* (2013.01); *H04L 45/121* (2013.01);
(Continued)

(58) Field of Classification Search
CPC ..... H04L 45/00; H04L 45/22; H04L 45/123; H04L 45/124; H04L 67/1023; H04L 67/1025; H04L 67/101; H04L 67/1002; H04L 67/1097; H04L 2029/06054; H04W 40/00; H04W 40/02; H04M 15/8061; H04M 2215/42

USPC ....... 709/217, 219, 223, 224, 238, 240, 241; 370/235, 238, 351

See application file for complete search history.

(56) References Cited

U.S. PATENT DOCUMENTS

| 5,754,543 A | * | 5/1998 | Seid ......................... H04L 45/12 370/256 |
| 6,034,946 A | | 3/2000 | Roginsky et al. |

(Continued)

FOREIGN PATENT DOCUMENTS

| WO | 98/31107 A2 | 7/1998 |
| WO | 02/25463 A1 | 3/2002 |
| WO | 02/25463 | 3/2006 |

OTHER PUBLICATIONS

Bergfeldt, et al.; Real-Time Available-Bandwidth Estimation using Filtering and Change Detection; Elsevier Computer Networks (COMNET); vol. 53, Issue 15, pp. 2617-2645, Oct. 2009.
(Continued)

*Primary Examiner* — Liangche A Wang
*Assistant Examiner* — Johnny Aguiar
(74) *Attorney, Agent, or Firm* — Patent Portfolio Builders PLLC

(57) ABSTRACT

Node, computer software and method for selecting a resource that is available at multiple caches connected in a communication network. The method includes receiving from a user a request for the resource; identifying one or more caches of the multiple caches that store the resource; determining a total cost associated with a path between the user and each cache of the one or more caches storing the resource, the total cost including a static cost that reflects a topology of the communication network and a dynamic cost which is indicative of changing conditions of the communication network; and selecting one cache from the one or more caches that store the resource based on a lowest total cost of the one cache.

16 Claims, 10 Drawing Sheets

(51) Int. Cl.
    *H04L 12/701* (2013.01)
    *H04L 12/727* (2013.01)
    *H04L 12/721* (2013.01)
    *H04L 12/729* (2013.01)

(52) U.S. Cl.
    CPC ........... *H04L45/124* (2013.01); *H04L 45/125* (2013.01); *H04L 67/101* (2013.01); *H04L 67/1002* (2013.01); *H04L 67/1097* (2013.01); *H04L 67/2852* (2013.01)

(56) References Cited

U.S. PATENT DOCUMENTS

| | | | | |
|---|---|---|---|---|
| 6,052,718 | A * | 4/2000 | Gifford | H04L 29/12009 709/219 |
| 6,981,055 | B1 * | 12/2005 | Ahuja | H04L 45/04 370/401 |
| 7,355,977 | B1 * | 4/2008 | Li | H04L 45/00 370/235.1 |
| 2002/0007413 | A1 | 1/2002 | Garcia-Luna-Aceves | |
| 2004/0219922 | A1 * | 11/2004 | Gage | H04W 40/16 455/445 |
| 2005/0066052 | A1 | 3/2005 | Gupta et al. | |
| 2005/0188073 | A1 * | 8/2005 | Nakamichi | H04L 45/00 709/223 |
| 2008/0025222 | A1 * | 1/2008 | Nikolova | H04L 45/121 370/238 |
| 2008/0114892 | A1 * | 5/2008 | Bruno | G04L 45/125 709/234 |
| 2009/0172167 | A1 | 7/2009 | Drai et al. | |
| 2013/0073808 | A1 | 3/2013 | Puthalath et al. | |

OTHER PUBLICATIONS

Aho et al., "Data Structures and Algorithms," Jan. 11, 1983, Addison-Wesley Longman Publishing Co., Inc., Boston, MA, USA.
International Preliminary Report on Patentability mailed Apr. 20, 2012 in corresponding International application No. PCT/IB2009/007753.
Lee et al., "Measurement and Estimation of Network QoS Among Peer Xbox 360 Game Players," PAM '08 Proceedings of the 9th International Conference on Passive and Active Network Measurement, Apr. 29-30, 2008, pp. 41-50, Cleveland, OH, USA.
International Search Report and Written Opinion of the International Searching Authority issued in corresponding International application No. PCT/IB2009/007753, mailed Oct. 1, 2010.
Chinese Office Action and Search Report mailed May 30, 2014 in corresponding Application No. 200980162918.3.

* cited by examiner

| | $N_1$ | $N_2$ | | $N_n$ |
|---|---|---|---|---|
| $N_1$ | | $N_{12}$ | | $N_{1n}$ |
| $N_2$ | $N_{21}$ | | | |
| | | | | |
| $N_n$ | $N_{n1}$ | | | |

FIG. 9

| Available bandwidth | Cost |
|---|---|
| 50 | 20 |
| 75 | 15 |
| 25 | 40 |

FIG. 10

| Link Capacity | Assigned cost |
|---|---|
| 100 Mb | 20 |

FIG. 11

| Link capacity | Assigned cost | Available bandwidth | Cost | Delta ($\Delta$) |
|---|---|---|---|---|
| 100 | 20 | 60 | 20 | 0 |
| 100 | 20 | 75 | 15 | -5 |
| 100 | 20 | 25 | 40 | +20 |
| 100 | 20 | 40 | 25 | +5 | ness # DYNAMIC CACHE SELECTION METHOD AND SYSTEM

RELATED APPLICATIONS

This application is a continuation application of U.S. patent application Ser. No. 13/515,234, filed Jun. 11, 2012; which is a continuation of PCT/IB2009/07753, filed Dec. 14, 2009 the entire teachings of which are incorporated herein by reference.

TECHNICAL FIELD

The present invention generally relates to systems, software and methods and, more particularly, to mechanisms and techniques for dynamically selecting a cache having a desired content.

BACKGROUND

During the past years, the evolution of social networks and content delivery networks (CDN, which is used herein to cover both the content delivery and content distribution networks) was dramatic. More and more people prefer to either contact peers or friends via the social networks or to download content via CDN. Content types include web objects, downloadable objects (media files, software, documents), applications, real time media streams, and other components of internet delivery (DNS, routes, and database queries).

The progress of handheld devices, mostly mobile phones, made the process of downloading content from a CDN a common task for many users. However, as discussed next, there are limitations of the capacity of a CDN to intelligently allocate data files to a subset of caches.

A CDN is a system of computers that store copies of data, placed at various points in the network so as to maximize bandwidth for access to the data from clients throughout the network. A client accesses a copy of the data near to the client, as opposed to all clients accessing the same central server so as to avoid bottleneck near that server. However, the concept of a client accessing data "near" to the client is not very efficient as current implementations of CDN's seem to lack intelligent mechanisms to allocate data files to a subset of caches. One principle used by the existing CDNs is that data files can only be fetched from a cache in an edge node to which the client is directly attached. If the data file demanded by the client is not stored in that edge node, the CDN needs first to cache the desired data file there.

For a better understanding of the traditional CDN network, FIG. 1 shows a simplified example of a real world network 10 including plural nodes 12 and 14. The lowest row of circles represent edge nodes 14 while the remaining circles represent intermediary nodes 12. It is assumed that each end user computer (client) may be connected to only one edge node 14. Such a connection 16 is indicated by a dashed line from the client's computer or mobile device 18 to a corresponding edge node 14 in FIG. 1. It is further assumed that content or data files are cached only on edge nodes 14. In this particular example, the storage of one specific data file 20 in three caches 14a, 14b, and 14c is indicated by dashed lines 22. Note that the dashed lines 22 are not representing communication links.

The intermediate nodes 12 in the network 10 connect the total world of edge nodes 14 to each other. The lines among nodes 12 and 14 are real links between these nodes. In practice, all nodes 12 and 14 may be routers. Each link 24 between real nodes 12 and 14 is associated with a communication cost, indicated by the letter "c". A communication path between two edge nodes 14 may take different ways in the network 10, as shown in FIG. 1.

Thus, when user 18 requests the data file 20 from the edge node 14d to which user 18 is connected to the edge node 14d needs to identify which other node has the data file and which node is the closest, assuming that node 14d does not have that data file. The existing CDN networks may take into consideration a static cost that is associated with links 24. However, any change in the conditions of the network are not reflected in the existing static cost as this cost does not change and thus, the existing CDN networks lack this information and fail to accurately describe a live network.

Thus, there is a need to find a method to localize the requested data to the "closest" cache on which a copy of the data file is stored. In this case, closest means the cache node with the least costly path to the edge node to which the client is connected. Another feature missing in the existing CDNs is an intelligent mechanism capable of deciding which data file to store on which edge nodes, given the limited amount of storage in the network and for optimizing the network resources.

Another problem with the existing CDNs is that although there are several active end-to-end probing methods (general techniques for characterizing the capabilities of a network link or a path) and new methods are continuously being developed and refined, the applications that benefit from such measurements often require more knowledge than just end-to-end estimates. Another problem is that there is no clear protocol on how to maintain and aggregate measurement data from several sources. For example, CDN implementations usually rely on some existing methods to infer the "best" source node for serving a content request. In order for the CDN to make intelligent content migration, based on network measurements, it needs a system that keeps coherent measurement statistics between all nodes.

Accordingly, it would be desirable to provide devices, systems and methods that avoid the afore-described problems and drawbacks.

SUMMARY

Assets as, for example, content are desired to be provided to the users from locations that are most suitable to the users and/or operators. A suitable location may be a location that is cheapest to the operator of the network. In this way, receiving the content from a location cheapest to the operator of the network frees bandwidth in the network and/or balances the paths of the network. A suitable location may also be determined by optimizing path characteristics required by certain applications such as streaming media.

According to an exemplary embodiment, there is a method for selecting a resource that is available at multiple caches connected in a communication network. The method includes receiving from a user a request for the resource; identifying one or more caches of the multiple caches that store the resource; determining a total cost associated with a path between the user and each cache of the one or more caches storing the resource, the total cost including a static cost that reflects a topology of the communication network and a dynamic cost which is indicative of changing conditions of the communication network; and selecting one cache from the one or more caches that store the resource based on a lowest total cost of the one cache.

According to another exemplary embodiment, there is a node for selecting a resource that is available at multiple caches connected in a communication network. The node includes an interface configured to connect to other nodes and/or the multiple caches of the communication network; and a processor connected to the interface. The processor is configured to receive from a user a request for the resource; identify one or more caches of the multiple caches that store the resource; determine a total cost associated with a path between the user and each cache of the one or more caches storing the resource, the total cost including a static cost that reflects a topology of the communication network and a dynamic cost which is indicative of changing conditions of the communication network; and selecting one cache from the one or more caches that store the resource based on a lowest total cost of the one cache.

According to still another exemplary embodiment, there is a computer readable medium including computer executable instructions, the instructions, when executed, implement a method for selecting a resource that is available at multiple caches connected in a communication network. The method includes receiving from a user a request for the resource; identifying one or more caches of the multiple caches that store the resource; determining a total cost associated with a path between the user and each cache of the one or more caches storing the resource, the total cost including a static cost that reflects a topology of the communication network and a dynamic cost which is indicative of changing conditions of the communication network; and selecting one cache from the one or more caches that store the resource based on a lowest total cost of the one cache.

It is an object to overcome some of the deficiencies discussed in the previous section and to provide a node capable of discovering a more suitable location of a cache for a user. One or more of the independent claims advantageously provides a best cache in response to a request of the user.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 9 illustrates a dynamic cost associated with an available bandwidth estimate according to an exemplary embodiment;

FIG. 10 illustrates an assigned cost associated with a link capacity according to an exemplary embodiment;

FIG. 11 illustrates a cost difference between the static cost and the dynamic cost according to an exemplary embodiment;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a CDN network. However, the embodiments to be discussed next are not limited to these networks but may be applied to other existing networks.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

According to an exemplary embodiment, a method and network are configured to use a cost function that captures one or more attributes of the network. The cost function includes a combination of costs derived from active network measurements and real and/or virtual node topology of the network. The active network measurement method (see for example, Bergfeldt et al., Real-Time Available—Bandwidth Estimation using Filtering and Change Detection, Elsevier Computer Networks (COMNET), Vol. 53, Issue 15, pages 2617-2645, 2009, the entire content of which is incorporated herein by reference) stores the measurement data in a state matrix which is defined later. The active network measurements take into account the state of the network. Based on the measurements, a dynamic cost is associated with the path between edge nodes while the real and/or virtual node topology produces a static cost. The static cost may be modified by an operator as discussed next. Each of the costs is combined to form a total cost by a decision engine. Thus, content fetching by clients or content migration between caches are determined in the CDN based on the total cost that includes the dynamic cost and the static cost. The decision engine may perform the cost estimation based on state matrix, topology and a trustworthiness function as discussed next.

According to another exemplary embodiment, a state matrix is introduced and represents and aggregates network measurement data for distributed systems. This information can be used to select suitable paths or set of paths to use between two communicating nodes, for example, between the client and cache nodes in the CDNs.

Figures 1, 2:
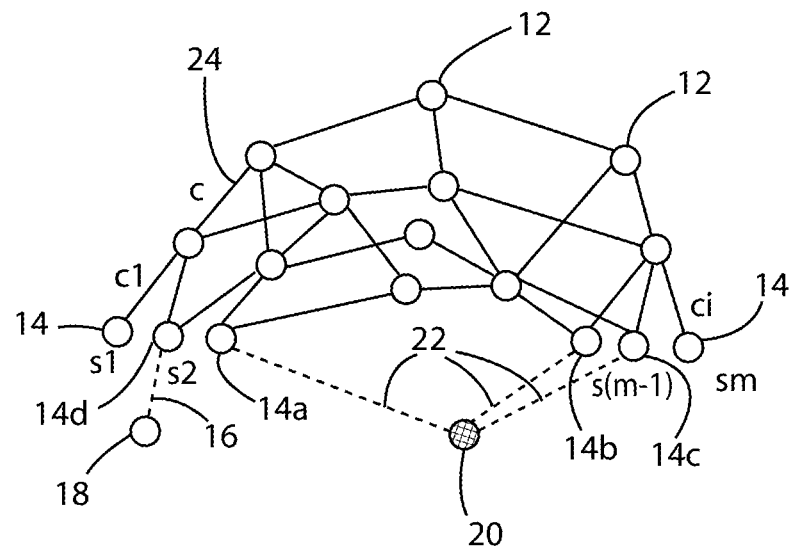
FIG. 1 is a schematic diagram of a traditional CDN.
FIG. 2 is an illustration of a state matrix according to an exemplary embodiment.

Before discussing how total costs for various paths between edge nodes in a CDN are calculated and made time dependent, the present exemplary embodiment discusses various ways for generating the state matrix. The state matrix may be defined to include performance parameters estimates obtained from active probing or passive monitoring between a set of nodes $\{N_1, N_2, \ldots, N_N\}$. In the case that more than one performance parameter is represented, it is possible to either use several state matrices in parallel, one for each performance parameter, or several elements for each pair of nodes in a single state matrix. Examples of performance parameters are end-to-end available capacity, round trip time (RTT), jitter, IP-layer topology, path available capacity, and loss. FIG. 2 shows an example of a state matrix in which an element $X_{ij}$ describes the path characteristics in terms of specific performance parameters observed between two nodes $N_i$ and $N_j$. It is noted that the path $N_i$ to $N_j$ may have different properties compared to the reverse path $N_j$ to $N_i$.

According to an exemplary embodiment, each element $X_{ij}$ in the state matrix includes at least the following parameters: performance parameter estimates, a time stamp that indicates when the measurement was made, and a timeout threshold to indicate when the measurement estimate expires. Optionally, the state estimate may include the variance of the estimate. The variance of the estimate may be used to provide the user of the state matrix with information on its trustworthiness. Other functions, as will be discussed later, may be used to provide this information.

The elements in the state matrix can be populated in various ways. Three examples are described below. However, other possibilities exist as will be recognized by those skilled in the art. The first and second examples are based on active probing and may provide performance parameters such as RTT, jitter, delay, path available capacity, and loss. The third example is based on passive monitoring and may provide other performance parameters, e.g., link load, queue lengths and dropped packets.

Figure 3:
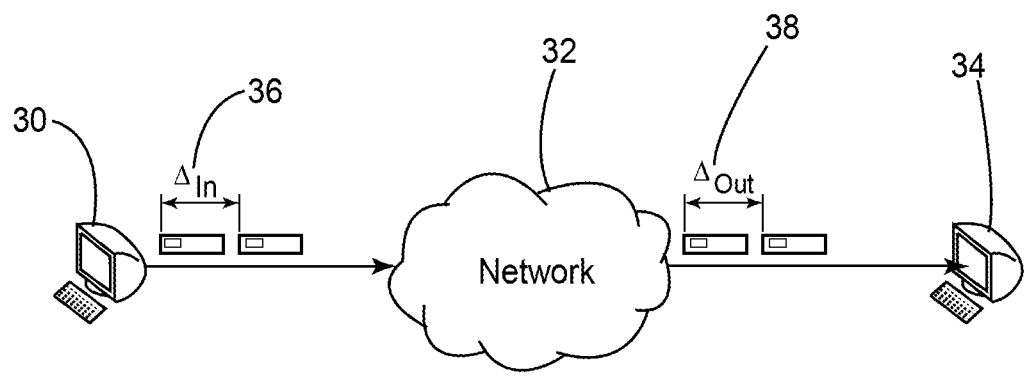
FIG. 3 is a schematic diagram of a path between a sender and a receiver.

The examples to be discussed next may use known techniques in the art. For completeness, these techniques are briefly discussed now. Active probing is a general technique to characterize a network link or a path by sending packets from a sender to a receiver. This method is illustrated in FIG. 3. More specifically, a sender 30 sends a packet via a network 32 to a receiver 34. Inter-packet separations 36 are randomized by the sender 30. The receiver 34 calculates the new inter-packet separations 38, which are then analyzed to determine the desired performance parameters. The performance parameters that can be measured with this method are, for example, jitter, packet loss, round-trip time, and path available bandwidth. Traditional tools that measure such performance parameters are, for example, various versions of ping. Measuring the available capacity is a more complex problem. One such measuring technique is Bandwidth Available in Real Time (BART) and is described in the next paragraph.

Figure 4:
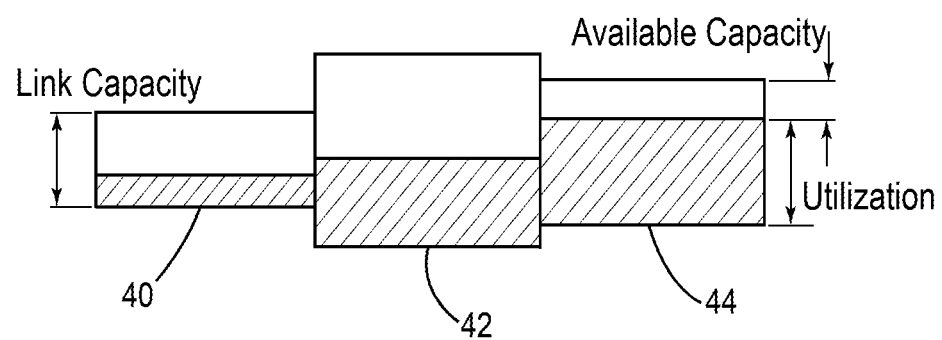
FIG. 4 is a schematic diagram of three different links connected to each other and having different levels of available bandwidth.

BART, which is a known technique in the art, is a method for estimating path available capacity and other capacity-related parameters in real time over packet-switched network paths. The concepts of performance parameters capacity, utilization and available capacity are illustrated in FIG. 4 which shows three links 40, 42, and 44 that are part of a network path. Each link has a nominal capacity that defines the maximum rate at which IP traffic can be sent. At any given point in time the links may be utilized at less than their maximum capacity. This is exemplified by the shaded area associated with each link. The available bandwidth is calculated for each link as the difference between the nominal link bandwidth and the estimated utilization of the link.

One capacity-related performance parameter is the end-to-end available capacity. This parameter is defined as the minimum link capacity for a set of consecutive links. In FIG. 4, link 40 is the minimum end-to-end available capacity. The BART method relies on actively sending probe traffic over the network path in order to determine at which probe rate the path shows signs of congestion. This rate defines the available capacity, i.e., the fraction of the capacity not utilized by IP traffic. As shown in FIG. 3, a BART sender 30 is transmitting IP packets at randomized inter-packet separations 36 towards the receiver 34. The separation is affected by other IP traffic sharing the network. The receiver 36 timestamps each incoming IP packet and calculates the new inter-packet separation 38. The inter-packet separations at the sender 30 and receiver 34 may be analyzed by a Kalman filter, a statistical method for tracking properties in real time that are not directly observable, and the output from that analysis is the available capacity.

Figure 5:
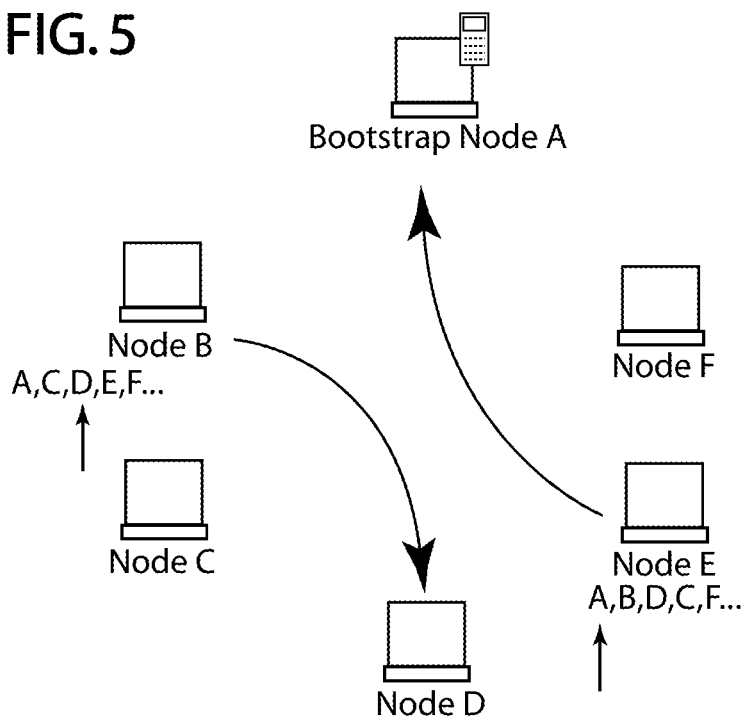
FIG. 5 is a schematic diagram illustrating an active probing method among nodes of a network.

The active probing discussed above may be used by the first example noted above, i.e., an autonomic measurement system. The properties of such a system are such that two nodes perform a measurement between each other with a certain probability given a certain time period. The measurement system executes the measurement as a background process on the participating nodes. As shown in FIG. 5, at a given point in time Node B triggers a measurement with node D, while at the same time, Node E triggers a measurement with Node A. All the nodes of the network may be triggered to perform such measurements and eventually, the state matrix is populated with data for every node.

The second example of populating the state matrix, still based on active monitoring, uses application data as measurement probes. When two nodes exchange data, e.g., in a CDN system where caches migrates data to and from each other, the nodes can piggyback probe information in the application data packets. The approach may be used for estimating end-to-end available capacity as such method requires more overhead in terms of probe traffic. For example, ping and RTT do not need to reuse application data.

The third example of populating the state matrix is based on passive monitoring instead of active monitoring. This method uses passive observations of the traffic in routers, caches and other nodes in order to determine load, loss and similar parameters. This approach needs access to intermediate network nodes as well as standardized protocols for retrieving data (such as Simple Network Management Protocol (SNMP)). Thus, the network elements need to reside within the operator's own domain or the operator needs access to the network elements involved.

Figure 6:
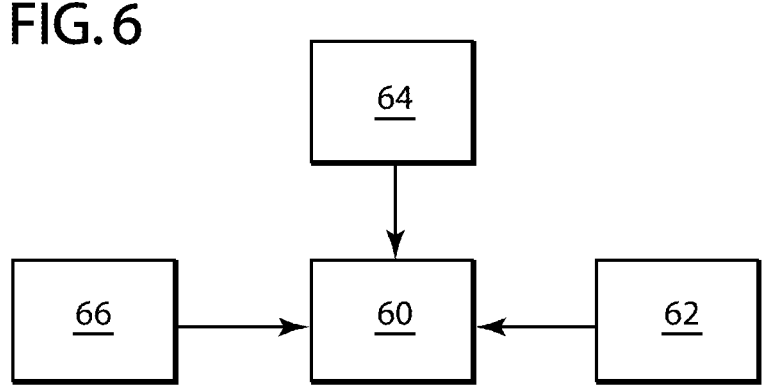
FIG. 6 is a schematic diagram showing what information is collected by a state matrix according to an exemplary embodiment.

All these three examples and associated methods may be used to populate the state matrix. According to an exemplary embodiment illustrated in FIG. 6, state matrix 60 uses (i) the autonomic measurement method 62 to receive a first set of parameters, e.g., RTT, jitter, delay, loss, path available bandwidth, etc. (ii) the application data measurement probe method 64 for determining a second set of parameters, e.g., RTT, jitter, delay, loss, path available bandwidth, etc. and (iii) a passive monitoring method 66 for determining a third set of parameters, e.g., link loads, dropped packets, etc.

According to an exemplary embodiment, the state matrix 60 may be populated using only one or a combination of the methods 62, 64, and 66. However, because the measurements from these methods may not be taken concurrently, i.e., the measurements may have different timestamps over a wide period, the time the measurement was performed and the time the measurement is used can vary from a few seconds to minutes or hours over a time window. Also, it may be the case that no measurement is carried out for a particular path. Thus, according to an exemplary embodiment, a reliability function is introduced to provide a way to consider the time dependency of the measurements in the state matrix. In other words, a trustworthiness function is introduced that is configured to filter out the time-based dependency.

This function may be based on the variance of the estimate and ensures that the relevance of the performance-parameter estimate declines with time. The rate of decline depends on the performance parameter of interest. For example, a RTT estimate is more stable in time compared to an estimate of the available capacity. The trustworthiness may be represented by a function $f(p, T_o, T)$, where T is the current time, $T_o$ is a timeout time, and p is the specific performance parameter type, e.g., RTT or available bandwidth. The specific definition of function f may vary depending on the application, as will be discussed next.

Figure 7:
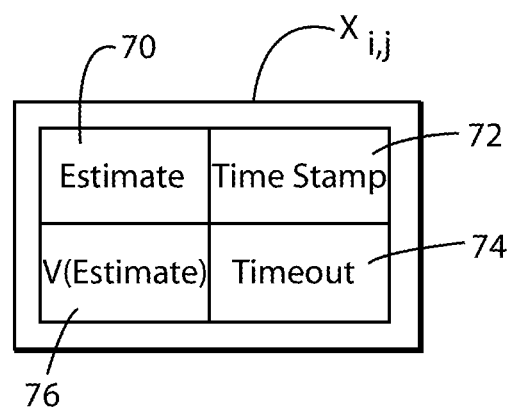
FIG. 7 is an illustration of an element of the state matrix according to an exemplary embodiment.

The elements $X_{i,j}$ of the state matrix 60 are shown in more details in FIG. 7. Each element may include an estimated/measured value 70 of a given parameter, a time stamp 72 associated with value 70 and indicating a time when the value was measured or estimated, the timeout time To 74 associated with the estimated/measured value 70, and a variance 76 of the estimated/measured value 70. The variance can be an additional parameter for specifying the trustworthiness function in FIG. 12. If the variance is high the curve above or below the static cost line converges faster towards this line. For example, a high variance may be represented by the curve above the static line while a low variance can be exemplified by the curve below the static line.

Figure 8:
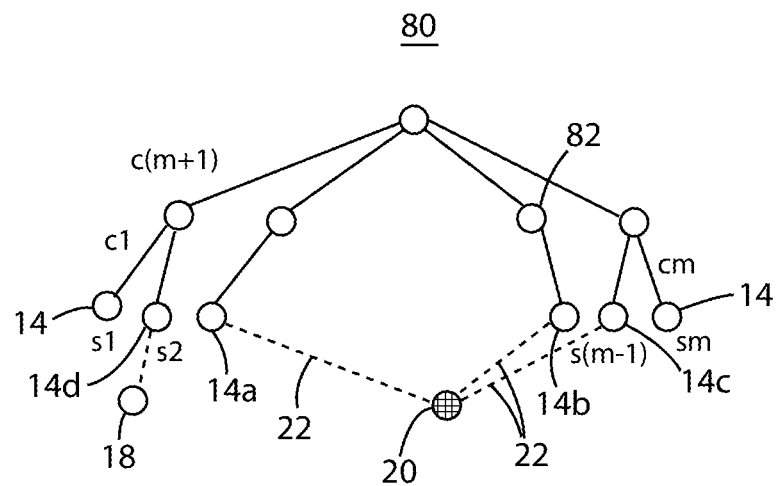
FIG. 8 is a schematic diagram of a virtual network corresponding to a real CDN network.

Before discussing how the cost function is applied to the measured parameters and how the novel smart network is able to determine the best cache for the content required by a user, one more ingredient is discussed. This refers to the static cost introduced above. To determine the static cost of links between nodes of a network, a hierarchical topology approximation technique may be used. The hierarchical topology approximation technique transforms the real network shown in FIG. 1 into a hierarchical network as shown in FIG. 8 that has the same path cost between any pair of edge nodes. The generation of the hierarchical network is known in the art and may be achieved in two steps.

The first step is to create the hierarchical virtual topology and the second step is to generate the cost for each link in the virtual topology in a way that minimizes the differences in path costs between the real network and the virtual network. Because the virtual network of FIG. 8 is hierarchical it can be modeled like a tree. Further, there exists precisely one path between any pair of edge nodes in the virtual network. These two characteristics make it possible to use less complex algorithms for calculating the static costs between edge nodes.

In the virtual network 80 shown in FIG. 8, the edge nodes 14 remain the same as in the real network 10 of FIG. 1, whereas the intermediate nodes 82 have no immediate correspondence to the intermediate nodes 12 of the real network 10. The particular way in which the virtual network 80 is created depends on the real network, the application and the available techniques as would be recognized by those skilled in the art. However, a real network is made up of islands of routers which are closer to each other than routers in other islands. Such islands may correspond to an intermediate node in the hierarchical topology. An analogy for better understanding the virtual network is to imagine real communities and streets/ways and a virtual model in which virtual nodes on one level may correspond to real cities, virtual nodes on the next higher level may correspond to real districts, and virtual nodes on the even next higher level may correspond to states. This first step of generating the hierarchical network may be achieved manually, by the operator of the network, or by a computing program that consults databases including the information needed.

In the second step, an optimization program may be used to assign costs to the links in the virtual network in a way that minimizes a difference in edge-to-edge path costs between the hierarchical and the real network. The particular optimization method used depends on the real network and other considerations that are relevant to the operator as various techniques are known in the art. One way is to locate the minima of an error function by a gradient search. The error function can be defined as a square sum of the difference in path cost for all paths, i.e., between all possible pairs of edge nodes. Once the hierarchical tree has been defined, which particular tree algorithm is applied is again a matter of choice and judicious selection based on finer details of the problem.

The hierarchical tree representation of the system enables the operator/provider of the CDN to assign static costs between the nodes of the system. These static costs/weights are used by the CDN in deciding the best cache to fetch an object/asset from. These static costs are numerical values and may be logically derived based on some characteristics of the underlying link. For example, a technique entitled Open Shortest Path First (OSPF) determines a static cost based on the bandwidth of the link. The static cost of a link in OSPF is calculated by dividing the reference bandwidth (100 Mbps by default) by the interface bandwidth. Thus, the total static cost to a destination is the sum of static costs of the individual links in the path to the destination.

Because the static cost is a logical value, by intentionally modifying the static cost of a link irrespective of the underlying characteristic of the link, the operator may influence the way the link is used. This capability provides more flexibility to the operator in running the network. Thus, the initial assignment of the static cost based on a fixed characteristic of the underlying physical link can be thought of as an assigned cost. If the static link cost is based on operators internal policy, this static cost may be thought of as a policy based cost. A policy based static cost is also an assigned static cost. However, the static cost does not take into consideration live modifications that the network may undertake and thus, is not an accurate parameter when deciding which cache to use in response to a user's request.

According to an exemplary embodiment, a dynamic cost is introduced that is sensitive to the variations of the network, for example, due to traffic. The dynamic cost may be combined with the static cost resulting in the novel cost function noted above. A total cost may be defined as being dependent on the static cost and the dynamic cost. The total cost C may be made time dependent by introducing the trustworthiness function f discussed above. In one particular embodiment, the time dependent total cost C(t) is given by a sum of (i) the static cost and (ii) a product between the dynamic cost and the trustworthiness function. These quantities are discussed next in more details.

As already discussed, the state matrix may store one or more measurements that are different from a cost of the associated link. Thus, a normalization function may be used to transform the elements $X_{i,j}$ of the state matrix to the dynamic cost. In other words, the normalization function maps the measured performance parameter to a dynamic cost that may be added to the static cost. For example, FIG. 9 shows the available capacity for a link and its associated dynamic cost. The available capacity is measured by active measurement methods, e.g., BART. The normalization function that generates the dynamic cost in the second column may have various forms, depending on the application. The dynamic cost shown in FIG. 9 corresponds to a single measured parameter. If multiple parameters are used, multiple dynamic costs may be determined. The dynamic cost changes as the performance parameters of the link change and for this reason the dynamic cost better reflects the cost of a real network. FIG. 10 shows the actual capacity in the first column and the static price associated/assigned with this link capacity in the second column. Other normalization functions may be used.

Based on the static cost and the dynamic cost, a difference $\Delta$ between the two may be calculated as shown in column 5 in FIG. 11. More specifically, for a same link, the difference $\Delta$ is calculated as a difference in cost between the link capacity obtained from the fixed network topology characteristics and the actual bandwidth obtained from active measurements. The cost difference $\Delta$ may be negative or positive as shown in FIG. 11. Thus, the cost difference $\Delta$ depends on both the static (assigned cost) and the dynamic cost.

The measurement system and the state matrix provide the real time performance parameters of the network while in operation. Based on the normalization function discussed above, the cost difference $\Delta$ identifies the actual logical cost between nodes in real time. This enables the CDN to provide a better response based on the actual state of the network.

Under ideal conditions, whenever the CDN logic needs an updated reading between nodes, the measurement system is able to provide the same instantaneously. However, in the real world, the measurements take time and the CDN system may not wait until the latest results are available. Hence the CDN logic needs to rely on the last or most recently taken measurements. The time difference between the present time and the time the measurements were taken may vary from a few seconds to a long time or none at all.

Thus, a function that implements a trustworthiness or reliability of the difference $\Delta$ is introduced according to an exemplary embodiment to provide a way to take into account the time dependency of the measured information when used in CDN. Such a function f has been discussed above. This function f provides a way to make the actual logical cost time dependent. This concept is now discussed in more details.

Figure 12:
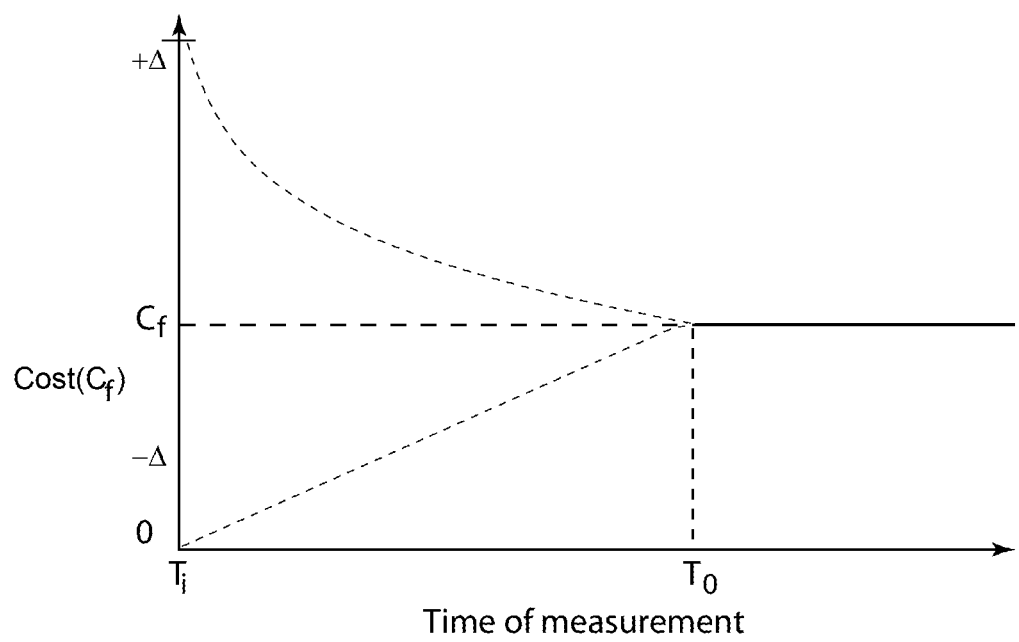
FIG. 12 illustrates a trustworthiness function associated with a cost difference according to an exemplary embodiment.

This function uses the assigned cost ($C_e$) from the network topology as the base line as shown in FIG. 12. The base line is used as the logical fixed cost if no measurement information is available. $T_i$ is the current time (instantaneous time) and $T_o$ (timeout time) is the time after which the measurement values are too old to be used. FIG. 12 provides an example of the trustworthiness function $f(T, T_o)$. Other functions may be used as deemed appropriate by the operator and as would be recognized by those skilled in the art. The shape of the trustworthiness function may depend on the estimate variance or on inherent features of the specific performance parameter used.

The trustworthiness function f decreases the value of the difference $\Delta$ over time. If the last measurement was taken just before the current time $T_i$ then the calculated difference $\Delta$ can vary from 0 to infinity as shown in FIG. 12. As the gap between the time of measurement and the present time becomes larger, the upper and lower possible values of $\Delta$ are reduced since the trustworthiness of the measurement decreases. After a time $T_o$ the $\Delta$ is no longer applicable and the total cost is the same as the assigned cost $C_f$. The illustration of how the influence of $\Delta$ on the total cost vary is just one example and a practical implementation depends on the network. Another example of the total cost may include a sum of (i) the static/assigned cost multiplied by (1−f) and (ii) the dynamic cost multiplied by f, where the trustworthiness function f varies between 0 and 1. In this case, if f=0, no trust in delta, the total cost is equal to the assigned cost while if f=1, full trust in delta, the total cost is equal to the dynamic cost.

Thus, the total cost $C_{ij}$ between two edge nodes i and j of the real network 10 may be expressed, in general, based on the individual quantities defined above and has the expression:

$$C_{ij}(A_{ij},\Delta_{ij},f_{ij})=A_{ij}\otimes\Delta_{ij}\otimes f_{ij},$$

where A is the assigned cost, $\Delta$ is the dynamic cost obtained from the state matrix through the normalization function, and f is the trustworthiness function. The operator $\otimes$ indicates that various mathematical operations may be used. A specific example for $C_{ij}$ has been discussed above. However, other functions may be used as would be recognized by those skilled in the art.

Figure 13:
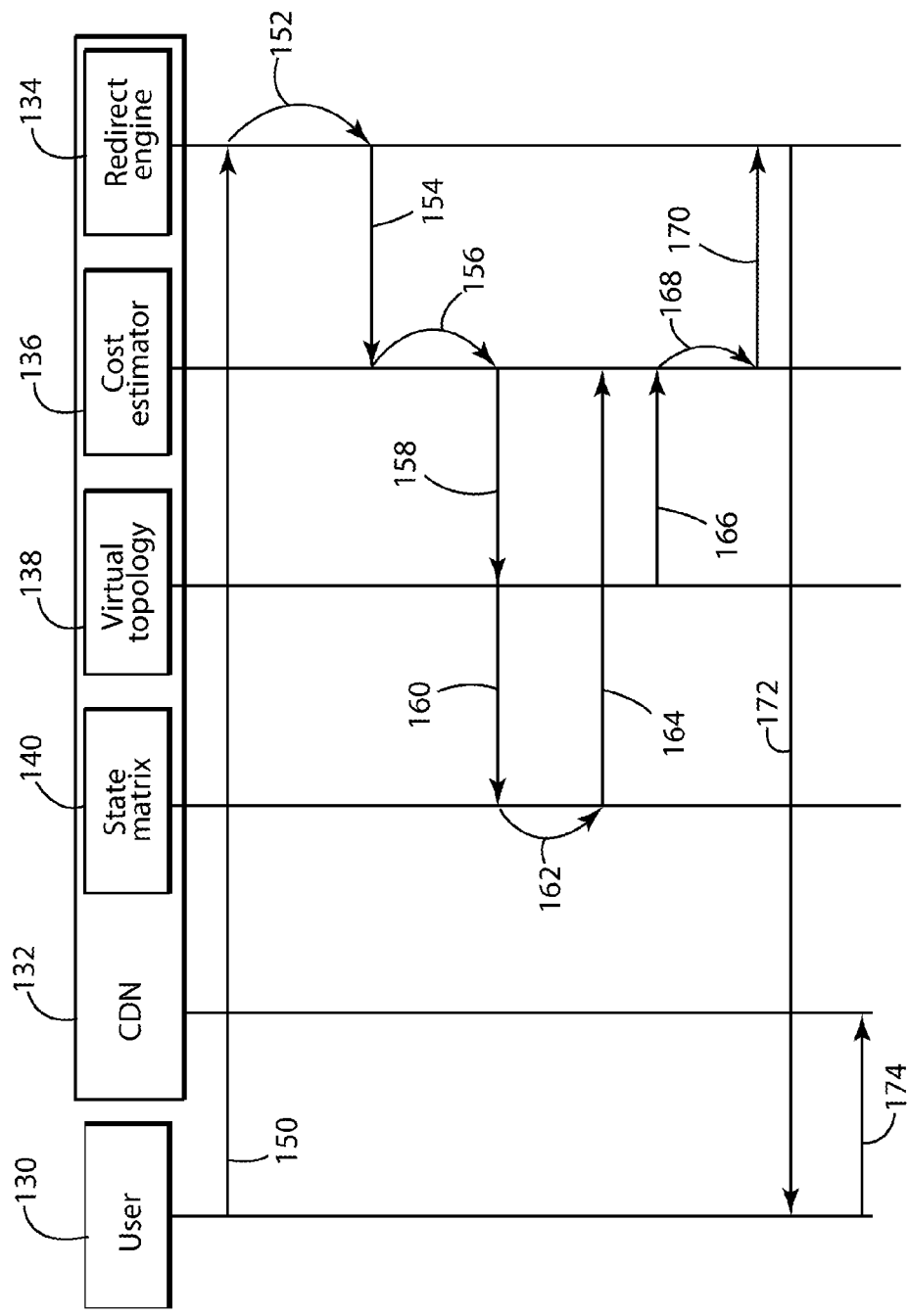
FIG. 13 illustrates various steps performed by a CDN network for providing a desired resource to a user according to an exemplary embodiment.

According to an exemplary embodiment, a process for selecting a resource is discussed with regard to FIG. 13. In FIG. 13, a user 130 requests in step 150 an asset X from a CDN 132. CDN 132 may include a redirect engine 134, a cost estimator unit 136, a virtual topology unit 138, a state matrix unit 140, etc. These units may be implemented in software, hardware, or a combination thereof. All these units may be implemented, in one application, in a processor in a single node. In another application, these units may be distributed at various nodes of the CDN in various processors.

The redirect engine 134 determines in step 152 whether the asset X is present in the CDN 132, and if the asset is present in multiple caches. In step 154 the redirect engine 134 queries the cost estimator 136 which is the best cache for the user 130. The cost estimator 136 builds paths to caches with asset X in step 156 and provides this information to the virtual topology unit 138. The virtual topology unit 138 transforms the real network into a hierarchical virtual network as discussed above. It is noted that this step is optional and the CDN network may perform the evaluation of best cache without the virtual topology unit 138. The information from the virtual topology unit 138 is passed in step 160 to the state matrix unit 140, which also receives measurement data from the measurement system of the network. Based on the measurement data and the virtual network, the state matrix unit 140 updates the matrix values in step 162 and provides this data to the cost estimator unit 136 in step 164. The cost estimator unit 136 also receives the virtual network data in step 166 and calculates in step 168 the total cost of each path from the edge node to which the user 130 is connected and the edge nodes having the asset X.

The edge nodes that have the asset X are ranked based on the total cost and the best cache information (e.g., the cache having the lowest cost) is provided in step 170 to the redirect engine 134. Based on this data, the redirect engine 134 responds to the query of user 130 providing the user with the address of the best cache in step 172. User 130 then fetch the asset X from the best edge node or the edge node to which the user 130 is connected is instructed by the CDN 132 to fetch the asset X from the best edge node and provides the asset X to the user 130.

Figure 14:
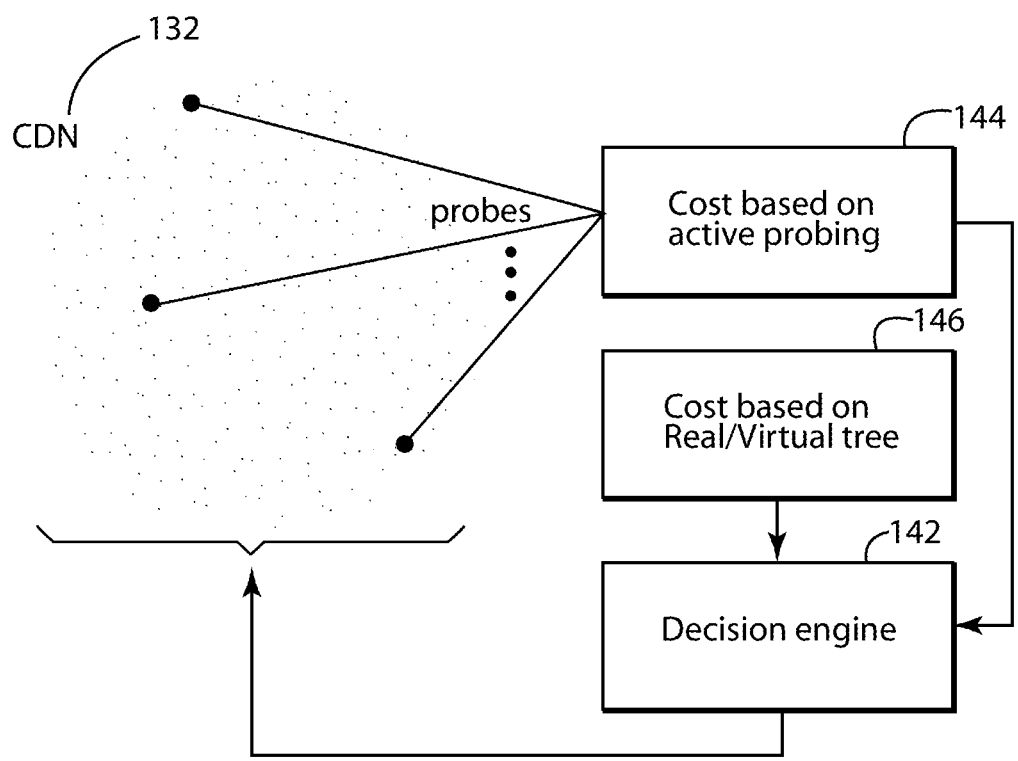
FIG. 14 illustrates a decision engine collecting data about a CDN network according to an exemplary embodiment.

According to an exemplary embodiment shown in FIG. 14, a decision engine 142 may be implemented in CDN 132 to decide a content fetch and migration of assets between various caches based on the (i) dynamic cost 144 and (ii) the static (assigned) cost 146.

Figure 15:
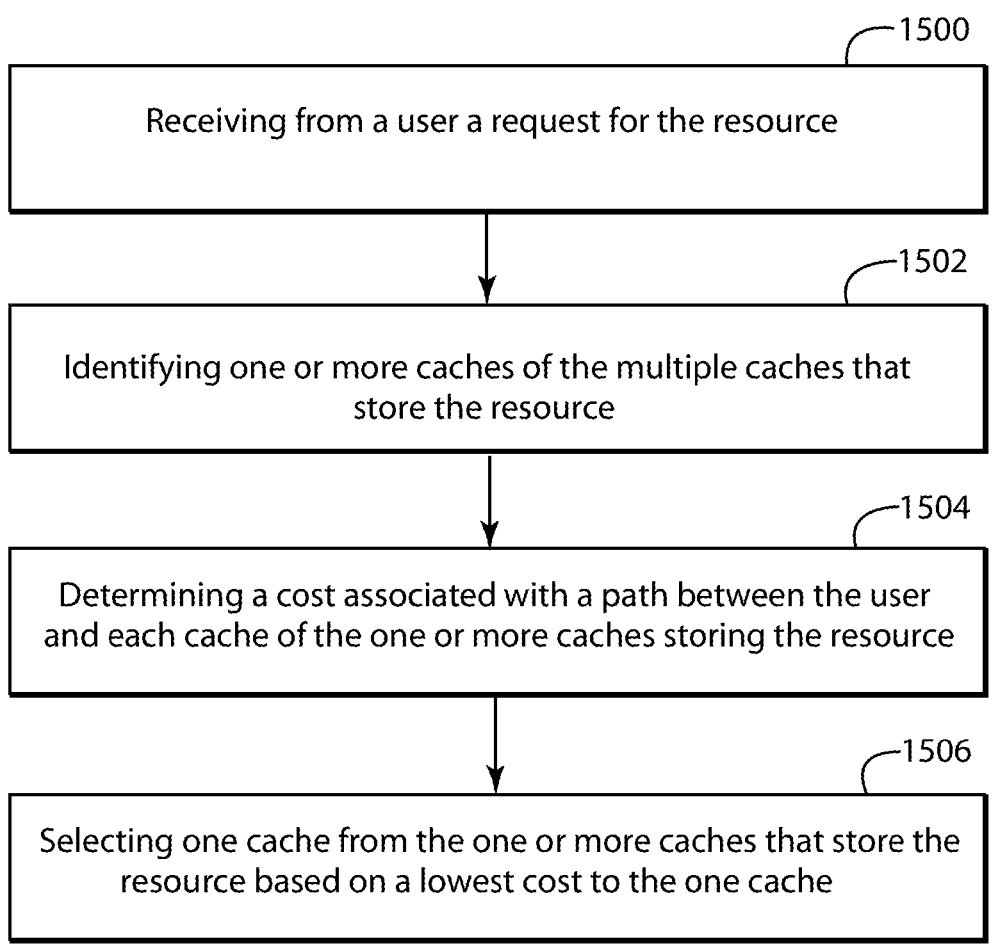
FIG. 15 is a flowchart illustrating a method for selecting a desired resource according to an exemplary embodiment.

According to an exemplary embodiment shown in FIG. 15, there is a method for selecting a resource that is available at multiple caches connected in a communication network. The method includes a step 1500 of receiving from a user a request for the resource, a step 1502 of identifying one or more caches of the multiple caches that store the resource, a step 1504 of determining a cost associated with a path between the user and each cache of the one or more caches storing the resource, wherein the cost includes a static cost that reflects a topology of the communication network and a dynamic cost which is indicative of changing conditions of the communication network, and a step 1506 of selecting one cache from the one or more caches that store the resource based on a lowest cost to the one cache.

One or more of the discussed exemplary embodiments may provide an accurate and dynamic cost estimate for content migration and retrieval compared to only using assigned costs as is the case of the traditional methods. Also, it is disclosed a novel method of determining the trustworthiness of the measured information of the network, a novel method for representing and aggregating network measurement data in distributed systems by taking into account possible variances based on, e.g., time. The novel method provides a dynamic picture of the network conditions to be used in data exchange networks such as CDNs where updated network state information is beneficial for the overall performance. One or more embodiments can be used as an input for enforcing operator policies taking into account dynamic network conditions and may enable measurement tools such as BART to be leveraged to provide recommendations for improving performance in distributed systems.

Figure 16:
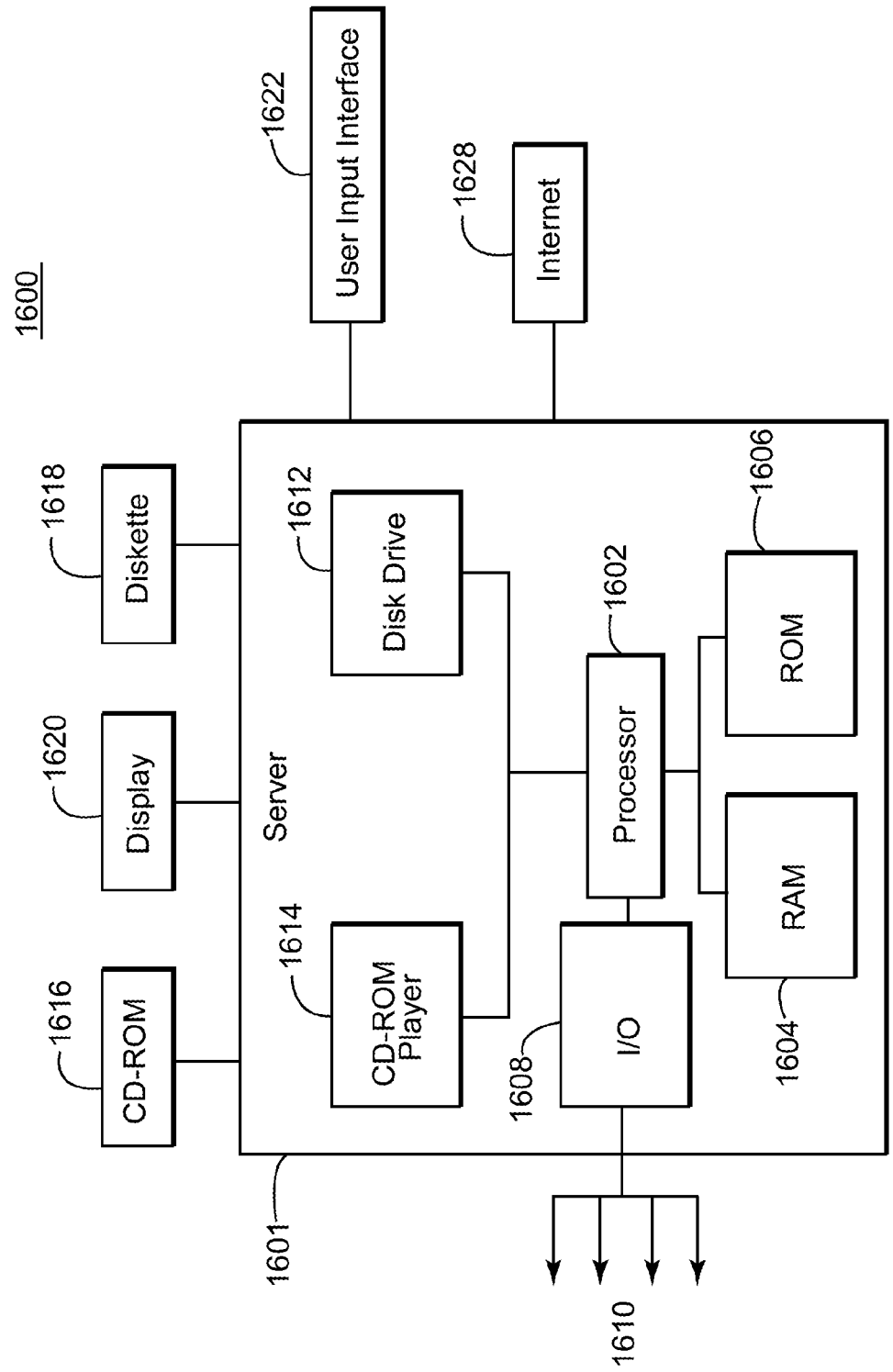
FIG. 16 is a schematic diagram of a node configured to implement the steps shown in FIGS. 14 and/or 15.

An example of a representative structure capable of carrying out operations in accordance with the exemplary embodiments is illustrated in FIG. 16. Hardware, firmware, software or a combination thereof may be used to perform the various steps and operations described herein. The exemplary arrangement 1600 suitable for performing the activities described in the exemplary embodiments may include server 1601, which may include one or more of the units 134, 136, 138, and 140 shown in FIG. 13. Such a server 1601 may include a central processor (CPU) 1602 coupled to a random access memory (RAM) 1604 and to a read-only memory (ROM) 1606. The ROM 1606 may also be other types of storage media to store programs, such as programmable ROM (PROM), erasable PROM (EPROM), etc. The processor 1602 may communicate with other internal and external components through input/output (I/O) circuitry 1608 and bussing 1610, to provide control signals and the like. The processor 1602 carries out a variety of functions as is known in the art, as dictated by software and/or firmware instructions.

The server 1601 may also include one or more data storage devices, including hard and floppy disk drives 1612, CD-ROM drives 1614, and other hardware capable of reading and/or storing information such as DVD, etc. In one embodiment, software for carrying out the above discussed steps may be stored and distributed on a CD-ROM 1616, diskette 1618 or other form of media capable of portably storing information. These storage media may be inserted into, and read by, devices such as the CD-ROM drive 1614, the disk drive 1612, etc. The server 1601 may be coupled to a display 1620, which may be any type of known display or presentation screen, such as LCD displays, plasma display, cathode ray tubes (CRT), etc. A user input interface 1622 is provided, including one or more user interface mechanisms such as a mouse, keyboard, microphone, touch pad, touch screen, voice-recognition system, etc.

The server 1601 may be coupled to other computing devices, such as the landline and/or wireless terminals and associated watcher applications, via a network. The server may be part of a larger network configuration as in a global area network (GAN) such as the Internet 1628, which allows ultimate connection to the various landline and/or mobile client/watcher devices.

The disclosed exemplary embodiments provide a node, a method and a computer program product for determining a resource. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A method for selecting a resource available at multiple caches connected in a communication network, the method comprising:
receiving from a user a request for the resource;
identifying one or more caches of the multiple caches storing the resource;
determining a total cost associated with a path between the user and each cache of the one or more caches storing the resource, wherein the total cost includes a static cost reflecting a topology of the communication network and a dynamic cost indicative of changing conditions of the communication network; and selecting one cache from the one or more caches storing the resource based on a lowest total cost of the one cache, wherein the determining step further comprises:

receiving parameters characterizing a performance of real paths;

generating the dynamic cost based on the received parameters;

calculating a difference between the dynamic cost and the static cost for a same path;

applying a trustworthiness function to the calculated difference to make the calculated difference time dependent and to determine whether the calculated difference is within a predetermined range; and combining in a cost function the dynamic cost associated with the received parameters and the static cost to determine the total cost; and calculating the cost function as a sum between (i) the static cost and (ii) a product of the calculated difference and the trustworthiness function.

2. The method of claim 1, further comprising:

transforming real paths between nodes of the communication network into a virtual model, the virtual model including a single path between any pair of caches, wherein the nodes connect the multiple caches one to the other.

3. The method of claim 2, further comprising:

attributing an assigned cost to each of said single path between any pair of caches in the virtual model, wherein the assigned cost is an operator defined quantity and determines the static cost.

4. The method of claim 3, further comprising:

generating a state matrix characterizing any pairs of caches.

5. The method of claim 1, wherein the received parameters include one or more of jitter, packet loss, round-trip time, IP-layer topology, and/or path available capacity.

6. The method of claim 4, further comprising:

populating elements of the state matrix by using one or more of (i) an autonomic measurement system wherein two nodes perform a measurement between each other with a certain probability given a certain time period; (ii) application data as measurement probes; and (iii) passive monitoring of the nodes of the network.

7. The method of claim 6, wherein an element of the state matrix includes at least a measured parameter of the network, a variance of the measured parameter, a timestamp associated with a time when the measurement was taken, and a timeout parameter indicating a time when the measured parameter cannot be used.

8. The method of claim 1, further comprising:

selecting the trustworthiness function to produce a number only between zero and one.

9. A node for selecting a resource available at multiple caches connected in a communication network, the node comprising:

an interface configured to connect to other nodes and/or the multiple caches of the communication network; and a processor connected to the interface and configured to, receive from a user a request for the resource, identify one or more caches of the multiple caches storing the resource, determine a cost associated with a path between the user and each cache of the one or more caches storing the resource, wherein the cost includes a static cost reflecting a topology of the communication network and a dynamic cost indicative of changing conditions of the communication network, and select one cache from the one or more caches storing the resource based on a lowest cost of the one cache, wherein the processor is further configured to:

receive parameters characterizing a performance of real paths;

generate the dynamic cost based on the received parameters;

calculate a difference between the dynamic cost and the static cost for a same path;

apply a trustworthiness function to the calculated difference to make the calculated difference time dependent and to determine whether the calculated difference is within a predetermined range;

combine in a cost function the dynamic cost associated with the received parameters and the static cost to determine the total cost; and calculate the cost function as a sum between (i) the static cost and (ii) a product of the calculated difference and the trustworthiness function.

10. The node of claim 9, wherein the processor is further configured to:

transform real paths between the nodes of the communication network into a virtual model, the virtual model including a single path between any pair of caches, wherein the nodes connect the multiple caches one to the other.

11. The node of claim 10, wherein the processor is further configured to:

attribute an assigned cost to each of said single path between any pair of caches in the virtual model, wherein the assigned cost is an operator defined quantity and determines the static cost.

12. The node of claim 11, wherein the processor is further configured to:

generate a state matrix characterizing any pairs of cache.

13. The node of claim 9, wherein the received parameters include one or more of jitter, packet loss, round-trip time, IP-layer topology, and/or path available capacity.

14. The node of claim 12, wherein the processor is further configured to:

populate elements of the state matrix by using one or more of (i) an autonomic measurement system wherein two nodes perform a measurement between each other with a certain probability given a certain time period; (ii) application data as measurement probes; and (iii) passive monitoring of the nodes of the network.

15. The node of claim 14, wherein an element of the state matrix includes at least a measured parameter of the network, a variance of the measured parameter, a timestamp associated with a time when the measurement was taken, and a timeout parameter indicating a time when the measured parameter cannot be used.

16. A non-transitory computer readable medium including computer executable instructions, wherein the instructions, when executed, implement a method for selecting a resource available at multiple caches connected in a communication network, the method comprising:

receiving from a user a request for the resource;

identifying one or more caches of the multiple caches storing the resource;

determining a cost associated with a path between the user and each cache of the one or more caches storing the resource, wherein the cost includes a static cost reflecting a topology of the communication network and a dynamic cost indicative of changing conditions of the communication network; and selecting one cache from the one or more caches storing the resource based on a lowest cost of the one cache, wherein the determining step further comprises:

receiving parameters characterizing a performance of real paths;

generating the dynamic cost based on the received parameters;

calculating a difference between the dynamic cost and the static cost for a same path;

applying a trustworthiness function to the calculated difference to make the calculated difference time dependent and to determine whether the calculated difference is within a predetermined range; and combining in a cost function the dynamic cost associated with the received parameters and the static cost to determine the total cost; and calculating the cost function as a sum between (i) the static cost and (ii) a product of the calculated difference and the trustworthiness function.

* * * * *